(12) United States Patent
Gandhi et al.

(10) Patent No.: US 12,021,804 B2
(45) Date of Patent: Jun. 25, 2024

(54) METHOD AND SYSTEM FOR STORING AND MANAGING DIGITAL ASSETS

(71) Applicant: YAHOO ASSETS LLC, New York, NY (US)

(72) Inventors: Kaivalya Gandhi, Sunnyvale, CA (US); Kelly Xu, Sunnyvale, CA (US); Nil Sahoo, Sunnyvale, CA (US); Rafi Sarussi, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/450,447

(22) Filed: Aug. 16, 2023

(65) Prior Publication Data
US 2024/0080288 A1 Mar. 7, 2024

Related U.S. Application Data

(60) Provisional application No. 63/401,114, filed on Aug. 25, 2022.

(51) Int. Cl.
*H04L 51/08* (2022.01)
*H04L 51/42* (2022.01)
*H04L 67/02* (2022.01)

(52) U.S. Cl.
CPC .............. *H04L 51/08* (2013.01); *H04L 51/42* (2022.05); *H04L 67/02* (2013.01)

(58) Field of Classification Search
CPC ......... H04L 51/07; H04L 51/08; H04L 51/21; G06Q 10/07
See application file for complete search history.

(56) References Cited

U.S. PATENT DOCUMENTS

| 10,616,161 | B1 * | 4/2020 | Grabovitch | ............. H04L 51/08 |
| 2013/0268839 | A1 * | 10/2013 | Lefebvre | ................. G06F 40/10 |
| | | | | 715/254 |
| 2015/0186494 | A1 * | 7/2015 | Gilad | ...................... H04L 51/42 |
| | | | | 707/740 |
| 2020/0202388 | A1 * | 6/2020 | Raviv | ................ G06Q 30/0269 |

* cited by examiner

*Primary Examiner* — Caroline H Jahnige
(74) *Attorney, Agent, or Firm* — James J. DeCarlo; Greenberg Traurig, LLP

(57) ABSTRACT

In some aspects, the techniques described herein relate to a method including: obtaining, by a computing device, a set of messages, each message including message metadata and message structure, at least one message of the set of messages comprising a digital asset; clustering, by the computing device, the set of messages based on the message metadata and the message structure; classifying, by the computing device, the clusters into categories; determining, by the computing device, a digital asset structure from at least one message cluster; and generating, by the computing device, at least one mapping rule based on the digital asset structure.

20 Claims, 6 Drawing Sheets

METHOD AND SYSTEM FOR STORING AND MANAGING DIGITAL ASSETS

This application claims the benefit of priority from U.S. Provisional Patent Application No. 63/401,114, filed Aug. 25, 2022, which application is hereby incorporated herein in its entirety.

BACKGROUND

Users of messaging systems consistently receive numerous messages containing digital content or digital assets in addition to regular messages. Given that an overwhelming number of messages received by a user are promotional in nature (some studies reveal that 90%+ of emails in inboxes are from businesses) users can have a fear of missing out (FOMO) when it comes to capturing savings. This loss aversion creates anxiety and disappointment when important notifications (such as received digital assets) are missed or seen after a point of relevancy (e.g., purchase has already been made or stored value has expired). Many users can devote a great deal of effort (and system resources) to keeping track of information related to purchases and finances, including receipts, shopping lists, gift cards, packaging, subscriptions, budgets, etc. This information is often spread across devices, accounts, apps/websites, physical/digital modalities, and people within a household, making it difficult to keep up with and maintain accuracy and wasting system and network resources as, for example, users redundantly search for items they need or want, endeavor to consolidate data or items themselves, or navigate multiple apps or websites or devices.

Additionally, increased digital asset adoption has led to an increase in consumer demand for improved utilities surrounding digital assets. In short, current messaging systems lack the ability to easily intake, detect, store, and display digital assets for the user. Moreover, messaging systems do not allow for contextual procurement and management of digital assets. For example, currently a user that receives invitations (for weddings, anniversaries, birthdays and other special occasions) or wants to appreciate work well done from service providers (like personal accountants, the babysitter and other individuals they interact with day-to-day) would have to procure a digital asset from a third party in one environment and provide it to the recipient through another environment, again wasting system and network resources. Similarly, there are no current solutions for digitizing and storing physical assets along with digital assets and messages in one environment.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

A resource and time saving solution is needed that can provide a convenient, organized and automated affordance for users to visualize digital assets received in their digital mailboxes across accounts. This can allow users to capitalize on stored monetary value that they may have missed or forgotten about amidst their other received digital communications. A further solution is needed that can provide a way for users to scan their physical assets and automatically detect key metadata (e.g., via OCR technology) and combine it with digital assets. This can provide users a convenient, organized and collective way to manage their digital and physical assets within a communications platform or messaging service. Such solutions can promote increased utilization of unused digital assets, by virtue of being alongside messages that can inspire the user to redeem or otherwise use their digital assets.

The disclosure recognizes and solves these and other problems in the art of computerized messaging systems by providing a system and method for detecting, storing, and managing digital assets within a messaging system.

In some aspects, the techniques described herein relate to a method including: obtaining, by a computing device, a set of messages, each message including message metadata and message structure, at least one message of the set of messages comprising a digital asset; clustering, by the computing device, the set of messages based on the message metadata and the message structure; classifying, by the computing device, the clusters into categories; determining, by the computing device, a digital asset structure from at least one message cluster; and generating, by the computing device, at least one mapping rule based on the digital asset structure.

In some aspects, the techniques described herein relate to a method including automatically finding and suggesting digital assets (existing or purchasable at a discount) to use for merchants a user is interested in making a purchase with.

In some aspects, the techniques described herein relate to a method including automatically extracting and organizing received digital assets in an inbox of a messaging application.

In some aspects, the techniques described herein relate to a method including sending reminders for received and/or expiring digital assets in the inbox. In some aspects, the techniques described herein relate to a method including extracting expiration dates from digital assets as well as store policies, along with reminding the user when the gift card is about to expire.

Various details regarding the aforementioned embodiments are described herein.

Figure 1:
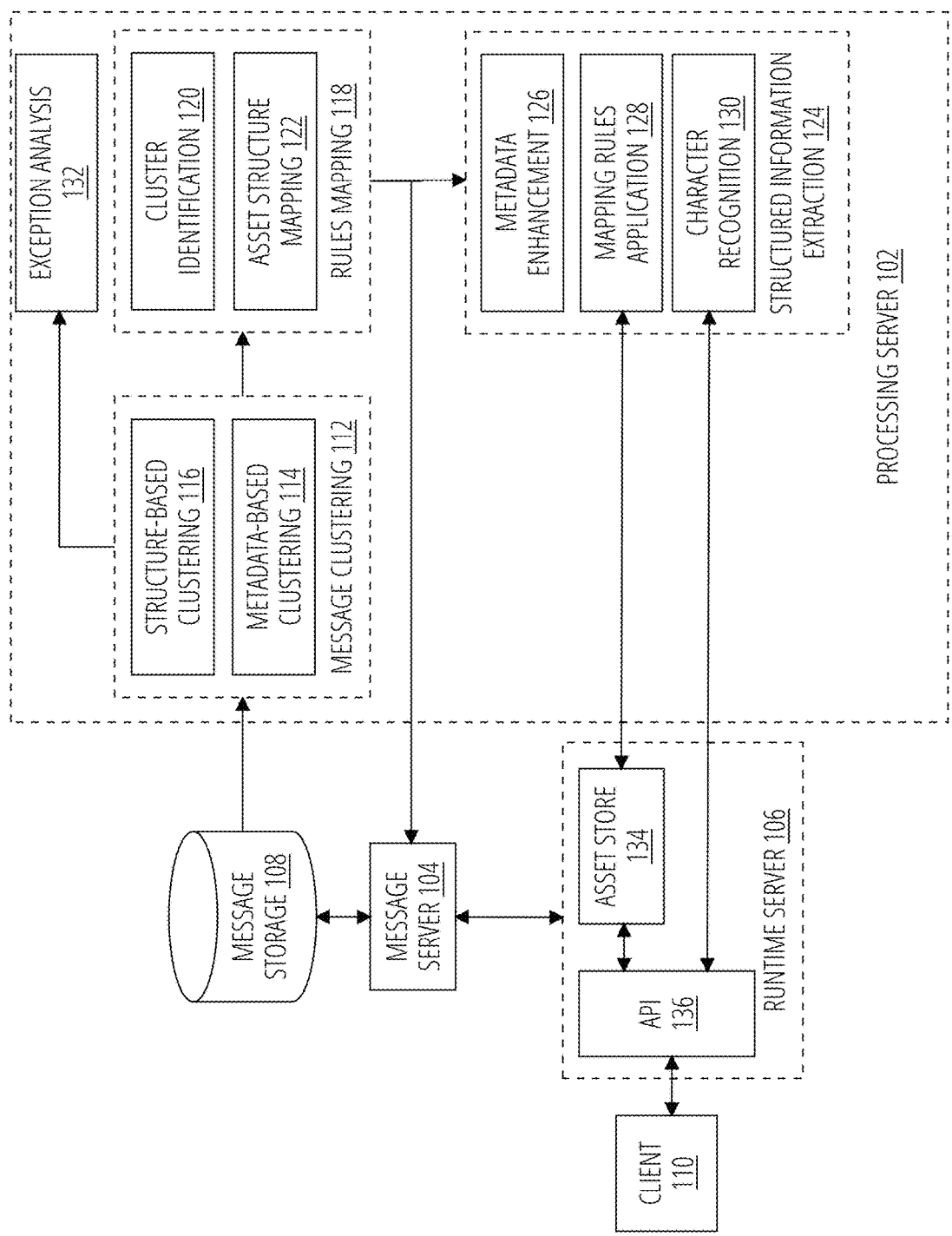
FIG. 1 is a block diagram illustrating a digital asset detection and management framework within a messaging system according to some embodiments.

FIG. 1 is a block diagram illustrating a digital asset identification and management framework within a messaging system according to some embodiments.

Framework 100 illustrates runtime and offline (e.g., prior to or concurrent with runtime) operations that can be performed by a messaging system to identify and manage digital assets. In the illustrated embodiment, prior to runtime, processing server 102 can obtain, retrieve, or otherwise receive a set of messages from message storage 108. According to some embodiments, a message can be an email, text message, in-app message, chat message, instant message, social network message or generally any other type of message. In some embodiments, the message can include message content, message data, header data, and/or metadata. In some embodiments, a message can include text, images, or videos. In some embodiments, the messages can include digital content or digital assets. In some embodiments, digital content or digital assets can include personal identification cards (e.g., driver's licenses, insurance cards), gift cards, coupons, and/or credit cards. In some embodiments, digital content or digital assets can have an associated monetary value. In some embodiments, the set of messages can include messages from one or many users. In some embodiments, the set of messages can be temporally limited (e.g., weeks, months). In some embodiments, the set of messages can include all messages in a messaging service (e.g., Yahoo Mail).

In some embodiments, processing server 102 can perform message clustering 112 on the retrieved messages using one or more clustering techniques to generate message clusters. In some embodiments, the message clusters can be the individual or combined result of the one or more techniques. In some embodiments, message clustering techniques can include metadata-based clustering 114 and/or structure-based clustering 116. In some embodiments, metadata-based clustering 114 can include determining similarity patterns between specific fields of the messages (e.g., message metadata) and clustering the messages based on the similarity patterns. For example, in some embodiments, where the message is an email, metadata-based clustering 114 can include using email subject fields to find similarity patterns by overlaying the subject values of emails within a sender domain and grouping similar subject emails into clusters. In some embodiments, messages can have semantic overlap in one or more fields. In some of those embodiments, metadata-based clustering 114 can include determining messages by identifying overlay generic patterns among compared messages.

In some embodiments, structure-based clustering 116 can include determining similarity between the structure of the messages and clustering the messages based on the similarities. In some embodiments, the messages can include a HyperText Markup Language (HTML) structure. In some of those embodiments, structure-based clustering 116 can include inspecting a body of a message and to identify text nodes of the HTML text and hashing the xpaths to the nodes followed by generalizing the HTML structure and calculating the distance between the nodes. In some embodiments, structure-based clustering 116 can include determining structure similarity between messages from a specific domain. In some embodiments, in structure-based clustering 116 messages with minimal variations in their text node xpaths are clustered together. Structure-based clustering 116 is further described in Appendix A.

According to some embodiments, message clustering 112 can be an ongoing process (e.g., offline and during runtime) performed by the processing server 102. In some embodiments, message clustering 112 can be cumulative and performed periodically. In some embodiments, processing server 102 can perform an exception analysis 132 operation for messages that could not be clustered. In some embodiments, during exception analysis 132 the messages can be segregated for human review to determine whether the messages are legitimate or to identify outliers that may be included in message mapping rules.

According to some embodiments, the message clusters are analyzed during rules mapping 118 to determine message mapping rules. In some embodiments, mapping rules can be applied to future messages to determine whether the messages include digital assets and the format or structure of such digital assets within the messages. In some embodiments, rules mapping 118 can include a cluster identification 120 operation where the message clusters are classified into one or more categories. In some embodiments, the categories can indicate whether a cluster includes messages with digital assets and/or the type of digital asset (e.g., ID card, gift card, store credit). In some embodiments, the clusters can be classified using a Machine Learning algorithm trained on manually annotated message clusters. In some embodiments, the clusters can be classified using a keyword matching algorithm. In some embodiments, a keyword search includes determining keywords relevant to a particular cluster and determining one or more cluster categories associated with the keywords.

In some embodiments, rules mapping 118 can include an asset structure mapping 122 operation to determine a message structure and/or digital asset structure for messages in clusters where the messages include digital assets (e.g., as determined by the categories). In some embodiments, asset structure mapping 122 can include automatically mapping the HTML structure of a given digital asset in messages including the digital assets. In some embodiments, automatically mapping the HTML structure can include detecting the position of similar pieces of information or metadata using a machine learning algorithm trained on previously mapped messages to HTML structures. In some embodiments, asset structure mapping 122 can include manually mapping, by a human reviewer, the HTML structure of a given digital asset in messages including the digital assets.

In some embodiments, during asset structure mapping 122 the HTML structure of the given digital asset can be mapped to a set of predefined attributes or fields for the given digital asset. In some embodiments, the predefined attributes can be arranged in a predefined syntax. In some embodiments, the resulting mapping rules can be used during a structured information extraction 124 operation at runtime to extract digital asset information from any given message.

Table 1 illustrates example predefined attributes of an example digital asset (e.g., a gift card) according to some embodiments. In some embodiments, each attribute can have a data type.

TABLE 1

| Field Name | Data Type | Description |
| --- | --- | --- |
| amount | MonetaryAmount | Indicates the monetary value of the asset and validity details. |
| provider | Organization | Name of the provider (e.g., Target, Kohls, etc.) |
| broker | Organization | Name of the third party broker that provides the asset. |

TABLE 1-continued

| Field Name | Data Type | Description |
| --- | --- | --- |
| paymentMethod | String | Payment network name. (e.g., Visa, Master, etc.) |
| paymentMethodId | String | Last 4 characters of payment network card number. |
| sponsor | Person | Details of person sponsoring the asset. |
| barcode | BarCode | Barcode details as applicable for the asset. |
| nature | Enum | Distinguish between digital or physical assets. (e.g., AssetPhysical or AssetDigital) |
| giftcardNumber | String | Identifier for assets, apart from barcode and payment network card numbers. |

Table 2 illustrates example predefined attributes of another example digital asset (e.g., a prepaid credit card or a gift card).

TABLE 2

| Field Name | Data Type | Description |
| --- | --- | --- |
| currency | String | ISO currency code of asset amount. |
| maxValue | Number | Full value of the asset. |
| value | Number | Current balance remaining in the asset. |
| validFrom | DateTime | Start date time of validity of the asset. |
| validThrough | DateTime | End date time of validity of the asset. |

Table 3 illustrates example predefined attributes of an example digital asset including a bar code.

TABLE 3

| Field Name | Data Type | Description |
| --- | --- | --- |
| image | String | Image URL of the asset barcode. |
| value | String | Barcode encoded value. |
| pinValue | String | Pin value for the asset. |

Table 4 illustrates example predefined attributes of an example digital asset including organization information of an organization.

TABLE 4

| Field Name | Data Type | Description |
| --- | --- | --- |
| name | String | Name of the organization. |
| url | String | URL to the website of the organization. |

Table 5 illustrates example predefined attributes of an example digital asset including information corresponding to a person.

TABLE 5

| Field Name | Data Type | Comment |
| --- | --- | --- |
| name | String | Name of the person |

The disclosure is not limited to the attributes and/or fields noted herein. Indeed, the attributes or fields can be any attributes or fields of any digital asset, known or to be known, without departing from the present disclosure.

Referring now to runtime operations according to some embodiments. In some embodiments, during runtime, the mapping rules can be applied to incoming messages in a stream processing pipeline. In some embodiments, the mapping rules can be applied to batches of incoming messages. In some embodiments, the message server 104 can receive a message from a third party server (not shown) or can obtain a message from the message storage 108. In some embodiments, message server 104 can provide the message to the runtime server 106. In some embodiments, message server 104 and runtime server 106 are the same server. In some embodiments, processing server 102, message server 104, and runtime server 106 are the same server.

In some embodiments, the message can be a message sent by a sender to a user. In some embodiments, processing server 102 can perform a structured information extraction 124 operation on the received message. While FIG. 1 illustrates structured information extraction 124 being part of the processing server 102, the disclosure is not so limited. In some embodiments, structured information extraction 124 can be part of or performed by message server 104 or runtime server 106 and message server 104 or runtime server 106 can receive, prior to runtime, the mapping rules from the rules mapping 118 operation by processing server 102. In some embodiments, runtime operations can be performed by the runtime server. In some embodiments, the mapping rules can be updated (e.g., by repeating message clustering 112 and rules mapping 118) during runtime as new messages are received.

According to some embodiments, structured information extraction 124 is performed on the received message. In some embodiments, the received message may have content or metadata corresponding to the digital asset that is corrupted or different from the expected HTML structure. In some of those embodiments, structured information extraction 124 can include a metadata enhancement 126 process to organize or identify the predetermined attributes for the digital asset from the message content or metadata. In some embodiments, metadata enhancement 126 can include human input. In some embodiments, metadata enhancement 126 can be an automatic process performed by processing server 102, message server 104, or runtime server 106. For example, in some embodiments, metadata enhancement 126 can include changing the format of the field (e.g., a date, amount, or name) to fit the format used by the mapping rules.

In some embodiments, the mapping rules can be applied to the received message before or after metadata enhancement (if enhancement was needed) to extract the information or values from the digital asset included in the message that correspond to the predetermined attributes corresponding to the given digital asset. In some embodiments, the result of the mapping rules application 128 operation is a structured schema or file including some or all of the extracted predetermined attributes. Example digital asset schema are illustrated in Appendix B. Example mapping rules are illustrated in Appendix C. In some embodiments, the structured schema is a JavaScript Object Notation (JSON) file. The following illustrate example digital asset files according to some embodiments.

```
"amount": {
    "@type": "MonetaryAmount",
    "currency": "USD",
    "maxValue": "100",
    "value": "29.30",
    "validThrough": "2024-12-31T12:59:59"
},
"provider": {
    "@type": "Organization",
    "name": "Amazon"
},
"paymentMethod": "http://sample.org/VISA",
"paymentMethodId": "3432"
}
{
"@type": "GiftCard",
"amount": {
    "@type": "MonetaryAmount",
    "currency": "USD",
    "maxValue": "100",
    "value": "29.30",
    "validThrough": "2024-12-31T12:59:59"
},
"provider": {
    "@type": "Organization",
    "name": "kohls"
},
"barcode": {
    "@type": "BarCode",
    "value": "12321323233453454354",
    "pin": "1234"
}
}
```

In some embodiments, the structured file corresponding to the digital asset has the same format or is the same file type (and has the same structure) as the received message including the digital asset. In that sense, in some embodiments, the structured file representing the digital asset (the digital asset file) is treated as if it were a message. In some embodiments, the digital asset file is stored in the same system as the message (e.g., asset store 134 or message storage 108). In some embodiments, the digital asset structured file can have an attribute identifying the parent message (e.g., the received message including the asset). Thus, in some embodiments, the digital asset file can be said to be linked to the parent message.

In some embodiments, a message including a digital asset can be a subsequent message to a prior message (e.g., an original message) including the digital asset. In those embodiments, the digital asset in the subsequent message can have different metadata from the digital asset in the original message (e.g., different monetary value or expiration date) In those embodiments, message server 104 can match the subsequent digital asset with the original asset based on one or more of the predetermined attributes and add or update the metadata of the original asset to reflect the metadata in the subsequent asset. In some of those embodiments, the original asset can be linked to both the parent message and the subsequent message or messages.

In some embodiments, the digital asset file can be provided to a client 110 through an API 136. In some embodiments, the API 136 can obtain the digital asset file from the asset store 134 or the message storage 108. In some embodiments, digital asset files can be labeled with specific labels indicating that it is a digital asset file. In some embodiments, API 136 can obtain the digital asset file from the asset store 134 or the message storage 108 based on a label assigned to the digital asset. In some embodiments, asset store 134 can be part of message storage 108. In some embodiments, asset store 134 can include all the digital asset files corresponding to the digital assets included in the messages corresponding to a user. In some embodiments, the client 110 can send a request to the message server 104 or runtime server 106 to provide one or more digital asset files from the asset store 134.

According to some embodiments, a user can store a physical asset as a digital asset. In those embodiments the user can scan or take a picture of the physical asset (e.g., the back and front of a card) using client 110. In some embodiments, client 110 is a messaging application running on a user device (e.g., devices 504-508 or device 600). Then, in some embodiments, the messaging client can send the images as a message where the recipient is the user (e.g., a self-message). In that sense, message server 104 or runtime server 106 can perform a character recognition 130 operation (e.g., optical character recognition (OCR)) to recognize text contents or information from the images. In some embodiments, the text contents can be processed using a metadata enhancement 126 operation prior to the mapping rules application 128 operation or be processed directly through the mapping rules application 128 operation. In some embodiments, the result from these operations is a digital asset file representing the physical asset. In some embodiments, prior to or parallel with the character recognition 130 the images can be processed through a machine learning processing layer to collect other details that cannot be extracted using character recognition, such as a barcode or a picture. In some embodiments, the client 110 can search digital asset files as it could messages in a typical messaging system.

Figure 3:
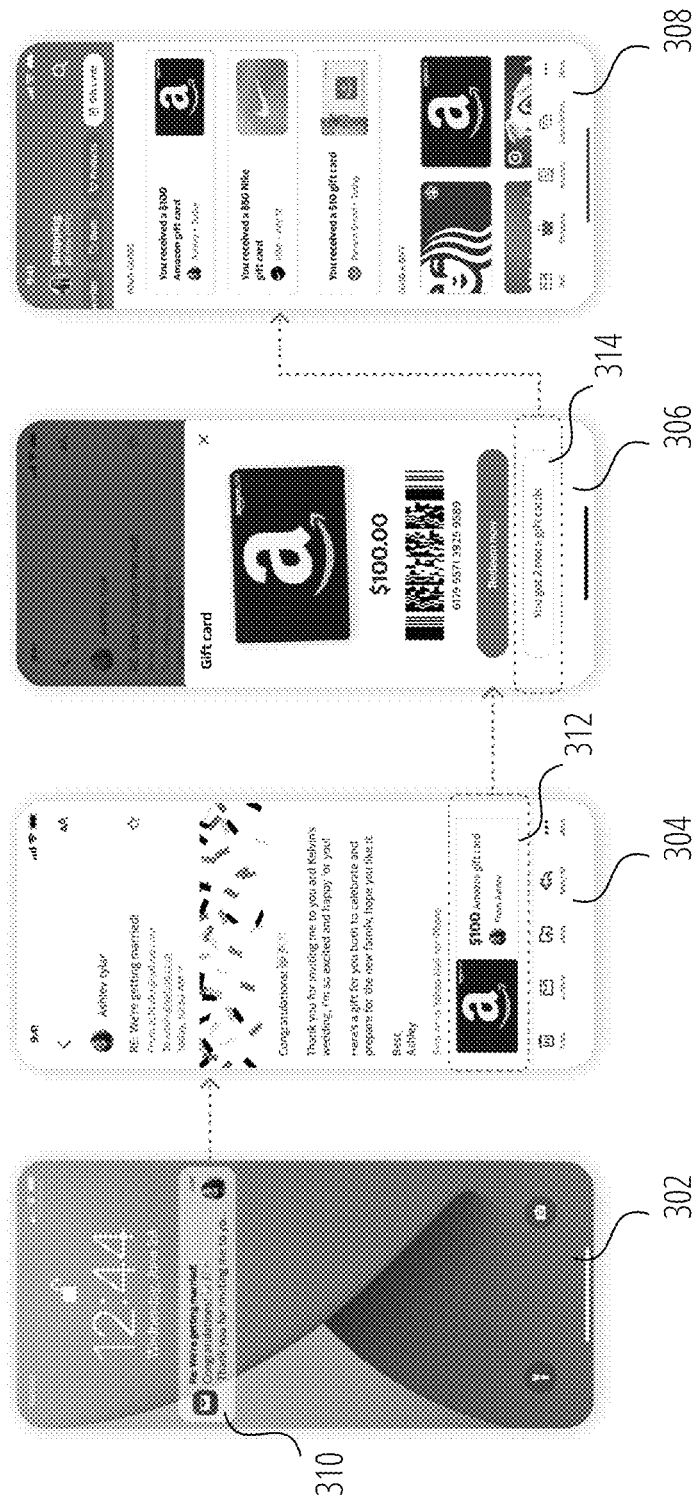
FIG. 3 illustrates user interface states of a process for receiving a digital asset according to some of the example embodiments.
Figure 4:
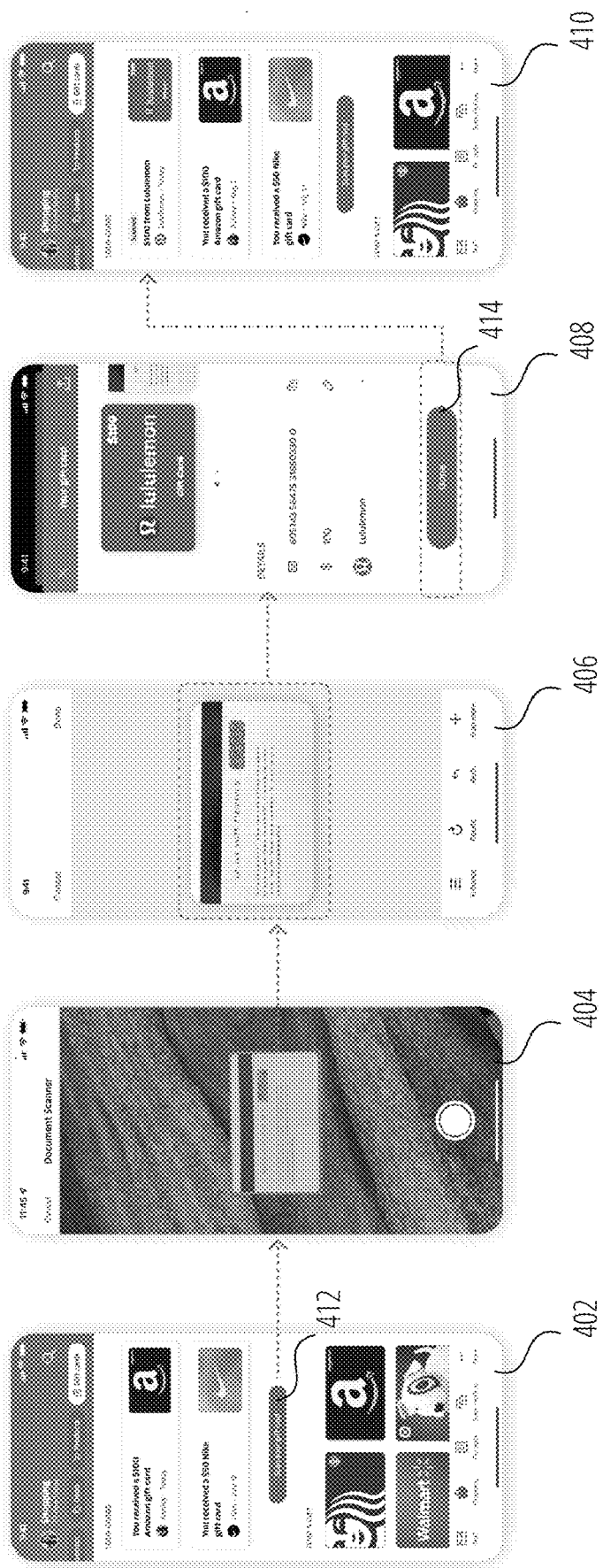
FIG. 4 illustrates user interface states of a process for scanning a physical asset according to some of the example embodiments.

In some embodiments, client 110 can have a user interface (UI) for use by a user. In some embodiments, when a new digital asset file is processed and stored in asset store 134, API 136 can recognize that a new digital asset has been received and added and can send a notification to the client 110. In turn, in some embodiments, the client 110 can notify the users through the UI, or in some other manner, that a new digital asset has been received. In some embodiments, the UI of the client 110 can have different portions or views for messages and digital assets (as shown in FIG. 3-FIG. 4).

Figure 2:
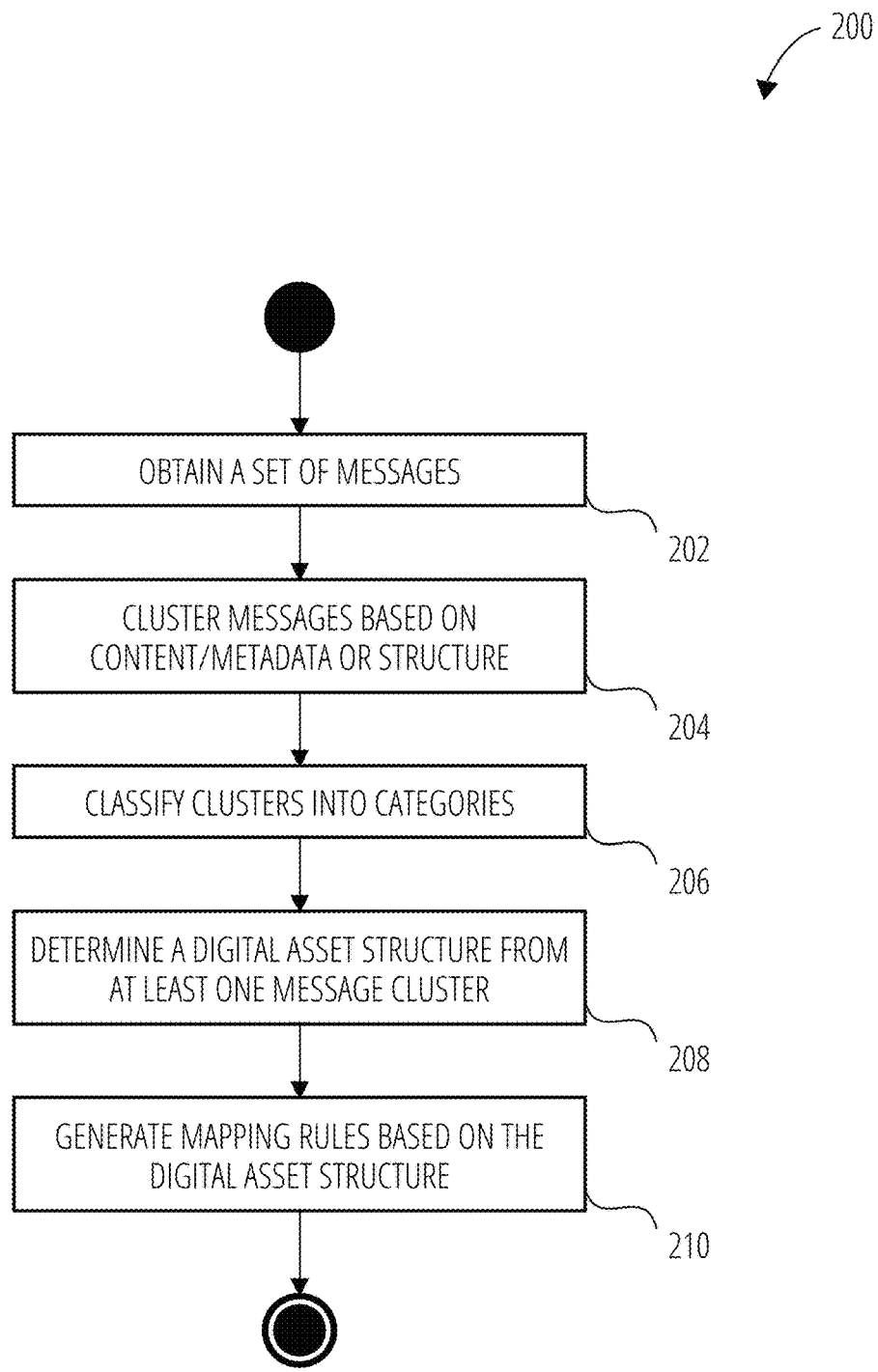
FIG. 2 is a flow diagram illustrating a method for determining mapping rules to extract digital assets from messages according to some embodiments.

FIG. 2 is a flow diagram illustrating a method for determining mapping rules to extract digital assets from messages according to some embodiments.

According to some embodiments, the steps of method 200 are performed in relation to framework 100 described in relation to FIG. 1. In Step 202, method 200 can include receiving a set of message. In some embodiments, the set of messages can correspond to a corpus of messages collected during normal operations of a messaging service. In some embodiments, the set of messages can correspond to a single user. In some embodiments, the set of messages can correspond to some or all of the users of a messaging service. In some embodiments, the set of messages can be temporally limited. In some embodiments, the set of messages can be a set of messages as described in relation to FIG. 1.

In Step 204, method 200 can include clustering the set of messages. In some embodiments, the messages can be clustered using metadata-based clustering techniques or structure based clustering techniques as discussed herein. In some embodiments, the messages can be clustered in part in relation to a domain of a sender of the messages.

In Step 206, method 200 can include classifying the clusters into categories. In some embodiments, clusters can be categorized by the sender of the messages within the cluster. In some embodiments, the cluster can be categorized by a type of digital asset in the messages. In some embodiments, the clusters can be classified using a keyword matching algorithm. In some embodiments, a keyword search includes determining keywords relevant to a particular cluster and determining one or more cluster categories associated with the keywords. In some embodiments, in Step 206, method 200 can include applying a machine learning algorithm to the clusters where the machine learning algorithm was trained on manually annotated clusters.

In Step 208, method 200 can include determining a digital asset structure from the message content or the message metadata. In some embodiments, determining the digital asset structure can include mapping message metadata to a set of predefined attributes or fields for the given digital asset. In some embodiments, determining a digital asset structure can include automatically mapping an HTML structure of a given digital asset in the messages including the digital assets. In some embodiments, automatically mapping the HTML structure can include detecting the position of similar pieces of information or metadata using a machine learning algorithm trained on previously mapped messages to HTML structures. In some embodiments, determining the digital asset structure can include manually mapping, by a human reviewer, the HTML structure of the given digital asset to the predetermined set of attributes.

In Step 210, method 200 can include generating a set of mapping rules based on the determined digital asset structure for a given digital asset in a cluster of messages. In some embodiments, the mapping rules can include associating message metadata and/or the location of metadata in the message with the set of predetermined attributes.

FIG. 3 illustrates user interface states of a process for receiving a digital asset according to some of the example embodiments.

In a first screen 302, a user is presented with a notification 310 indicating that a digital asset (e.g., a gift card) has been received. In some embodiments, the notification 310 can be a device push notification delivered after detection occurs (e.g., as described in relation to client 110 in FIG. 1). In some embodiments, upon interaction with the notification 310 a user can be presented with a second screen 304 rendering a message view of a messaging application. In the illustrated embodiments, the messaging application comprises an electronic mail application, although the example embodiments are not limited as such. In some embodiments, the message view can display a message including message metadata (e.g., sender, subject) and digital content 312 corresponding to the digital asset. In some embodiments, the expanded view can display available digital asset metadata (e.g., currency, amount, sponsor, provider, expiry date) based on the defined structure or schema as discussed in relation to FIG. 1. In some embodiments, the expanded view can include links to the original message containing complete information about the received digital asset.

In some embodiments, upon interaction with the digital content 312 an expanded view of the digital asset is rendered in the third screen 306. In some embodiments, in the third screen 306, the user can be presented with an option 314 to redeem the digital asset or view a digital asset view of the messaging application. In some embodiments, upon interaction with the option to view the digital asset, the user can be presented with a fourth screen 308. In some embodiments, the fourth screen 308 is a view of a digital asset container or collection. In some embodiments, the digital assets can be sorted in descending order of detection recency. In some embodiments, in the digital asset view the user can interact with any of the digital assets to induce the messaging application to render the expanded view of the digital asset.

FIG. 4 illustrates user interface states of a process for scanning a physical asset according to some of the example embodiments.

In a first screen 402, a user is presented with a digital asset view of a messaging application. In some embodiments, the user can initiate a digital asset scanning process by selecting an icon 412 in the digital asset view. In some embodiments, the second screen 404 can be triggered by user interaction with the icon 412.

In the second screen 404, the user is presented with a camera view of the messaging application to allow the user to take one or more pictures of the physical asset. In some embodiments, taking a picture of the physical asset triggers the display of a third screen 406 rendering an image of the physical asset based on the picture taken by the user. In the third screen 406, the user can be prompted to verify the digital asset information and upon an indication that the information is correct, the messaging application can render the fourth screen 408. In some embodiments, the fourth screen 408 is an expanded view of a digital asset including metadata or attributes of the digital asset. In some embodiments, upon interaction with a done button 414, a fifth screen 410 can be rendered. In some embodiments, the fifth screen 410 is a digital asset view of the messaging application. In some embodiments, the fifth screen 410 illustrates the now digitized physical asset as a digital asset. In some embodiments, the digital asset view can sort the digital assets in descending order of scanned date combined with the digital assets sorted in descending add date order. In some embodiments, the messaging application can further display an expanded digital asset view upon interaction with a digital asset. In those embodiments, the expanded digital asset view can include links to the original scan (e.g., picture) containing complete information about the physical asset. In those embodiments, the expanded digital asset view can include asset metadata (e.g., currency, amount, sponsor, provider, expiry date).

Figure 5:
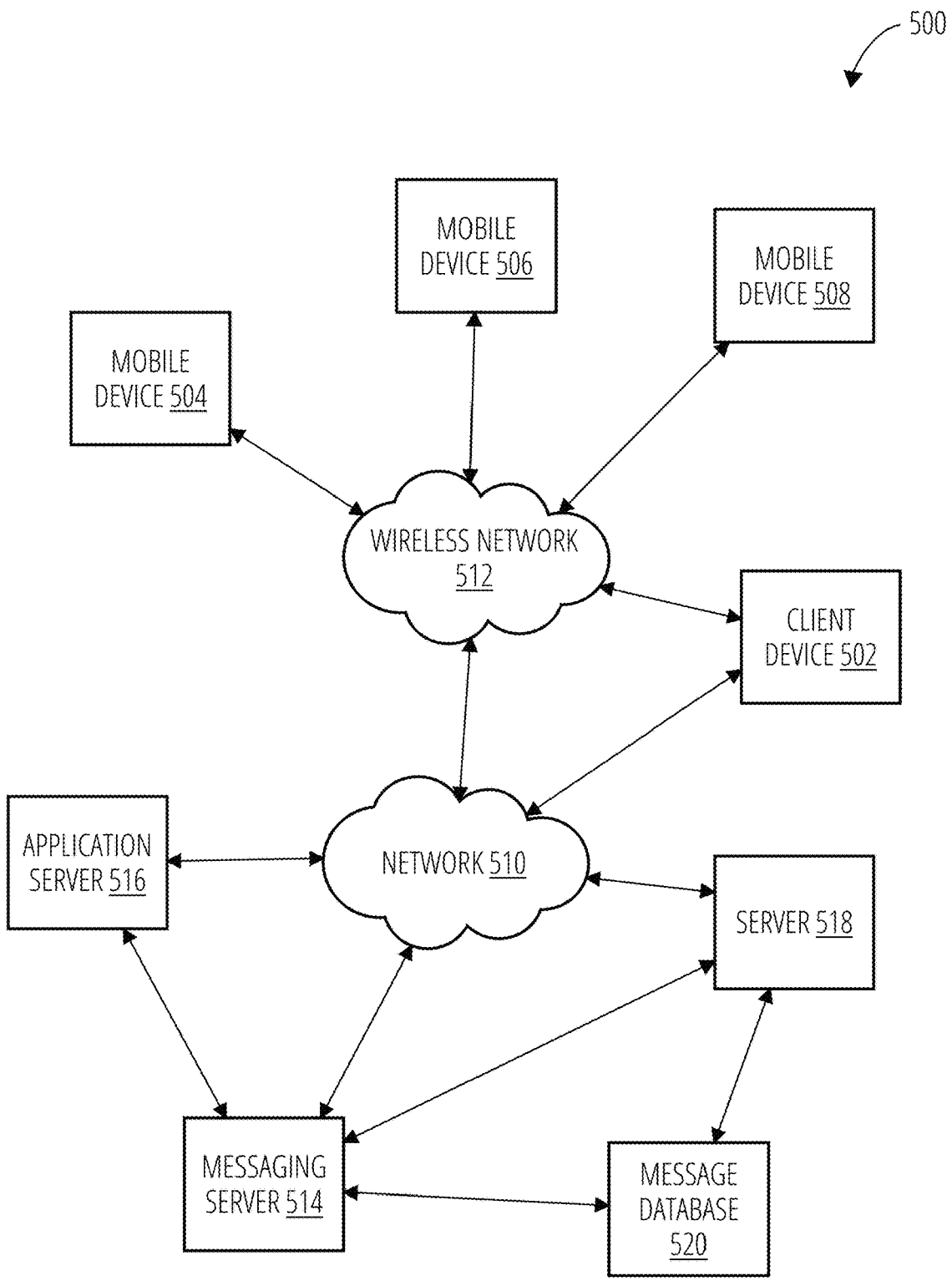
FIG. 5 is a block diagram illustrating an example environment within which the systems and methods disclosed herein could be implemented according to some embodiments.

FIG. 5 is a block diagram illustrating an example environment within which the systems and methods disclosed herein could be implemented according to some embodiments.

FIG. 5 shows components of a general environment in which the systems and methods discussed herein may be practiced. Not all the components may be required to practice the disclosure, and variations in the arrangement and type of the components may be made without departing from the spirit or scope of the disclosure.

FIG. 5 illustrates a system 500 in accordance with an embodiment of the present disclosure. As shown, system 500 can include local area networks ("LANs")/wide area networks ("WANs")—network 510, wireless network 512, mobile devices (client device) 504-508 and client device 502. System 500 can also include a variety of servers, such as messaging server 514, application ("App") server 516, and third party servers 518.

One embodiment of mobile devices 504-508 is described in more detail below. Generally, however, mobile devices 504-508 can include virtually any portable computing device capable of receiving and sending a message over a network, such as network 510, wireless network 512, or the like. In some embodiments, mobile devices 504-508 can also be described generally as client devices that are configured to be portable.

Mobile devices 504-508 can also include at least one client application that is configured to receive messages from another computing device. In some embodiments, the client application can include a capability to provide and receive textual content, graphical content, audio content, and the like. In some embodiments, the client application can further provide information that identifies itself, including a type, capability, name, and the like. In one embodiment, mobile devices 504-508 may uniquely identify themselves through any of a variety of mechanisms, including a phone number, Mobile Identification Number (MIN), an electronic serial number (ESN), or other mobile device identifier.

In some embodiments, mobile devices 504-508 can also communicate with non-mobile client devices, such as client device 502, or the like. In some embodiments, client device 502 may include virtually any computing device capable of communicating over a network to send and receive information.

In some embodiments, devices 502-508 can be referred to as computing devices. Devices 502-508 may be capable of sending or receiving signals, such as via a wired or wireless network, or may be capable of processing or storing signals, such as in memory as physical memory states, and may, therefore, operate as a server. Computing devices may, for example, include portable, non-portable, and wearable devices (e.g., desktop computers, cellular phones, smart watches, and tablets).

Wireless network 512 can be configured to couple mobile devices 504-508 and its components with network 510. Wireless network 512 can include any of a variety of wireless sub-networks that may further overlay stand-alone ad-hoc networks, and the like, to provide an infrastructure-oriented connection for mobile devices 504-508. Such sub networks can include mesh networks, Wireless LAN (WLAN) networks, cellular networks, and the like. In some embodiments, a wireless network may include virtually any type of wireless communication mechanism by which signals may be communicated between computing devices.

Network 510 is configured to couple messaging server 514, App server 516, or the like, with other computing devices, including, client device 502, and through wireless network 512 to mobile devices 504-508. Network 510 is enabled to employ any form of computer readable media or network for communicating information from one electronic device to another. Also, network 510 can include the Internet in addition to local area networks (LANs), wide area networks (WANs), or direct connections. According to some embodiments, a "network" should be understood to refer to a network that may couple devices so that communications may be exchanged (e.g., between a server and a client device) including between wireless devices coupled via a wireless network, for example. A network may also include mass storage or other forms of computer or machine readable media, for example.

In some embodiments, the messaging server 514 can include a device that includes a configuration to provide any type of messaging or form of content via a network to another device. Messaging server 514 can further provide a variety of services that include, but are not limited to, email services, instant messaging (IM) services, streaming and/or downloading media services, search services, photo services, web services, social networking services, news services, third-party services, audio services, video services, mobile application services, or the like. Such services, for can be provided via the App server 516, whereby a user is able to utilize such service upon the user being authenticated, verified or identified by the service. In some embodiments, messaging server 514, App server 516, and third-party server 518 can store, obtain, retrieve, or provide interactive content and/or interactive content data as discussed herein.

Servers 514, 516, and 518 may be capable of sending or receiving signals, such as via a wired or wireless network, or may be capable of processing or storing signals, such as in memory as physical memory states. According to some embodiments, a "server" should be understood to refer to a service point which provides processing, database, and communication facilities. In some embodiments, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers 514, 516, and/or 518 via the network 510 and/or wireless network 512 using their various devices 502-508.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), streaming video applications (e.g., YouTube®, Netflix®, Hulu®, iTunes®, Amazon Prime®, HBO Go®, and the like), instant messaging applications, blog, photo or social networking applications (e.g., Facebook®, Twitter®, Instagram®, and the like), search applications (e.g., Yahoo!® Search), and the like, can be hosted by the App server 516, messaging server 514, and the like.

Thus, the App server 516, for example, can store various types of applications and application related information including application data and user profile information (e.g., identifying and behavioral information associated with a user). It should also be understood that messaging server 514 can also store various types of data related to the content and services provided by messaging server 514 in an associated message database 520, as discussed in more detail below.

Moreover, although FIG. 5 illustrates servers 514, 516, and 518 as single computing devices, respectively, the disclosure is not so limited. For example, one or more functions of servers 514, 516, and/or 518 can be distributed across one or more distinct computing devices. Moreover, in one embodiment, servers 514, 516, and/or 518 can be integrated into a single computing device, without departing from the scope of the present disclosure.

Figure 6:
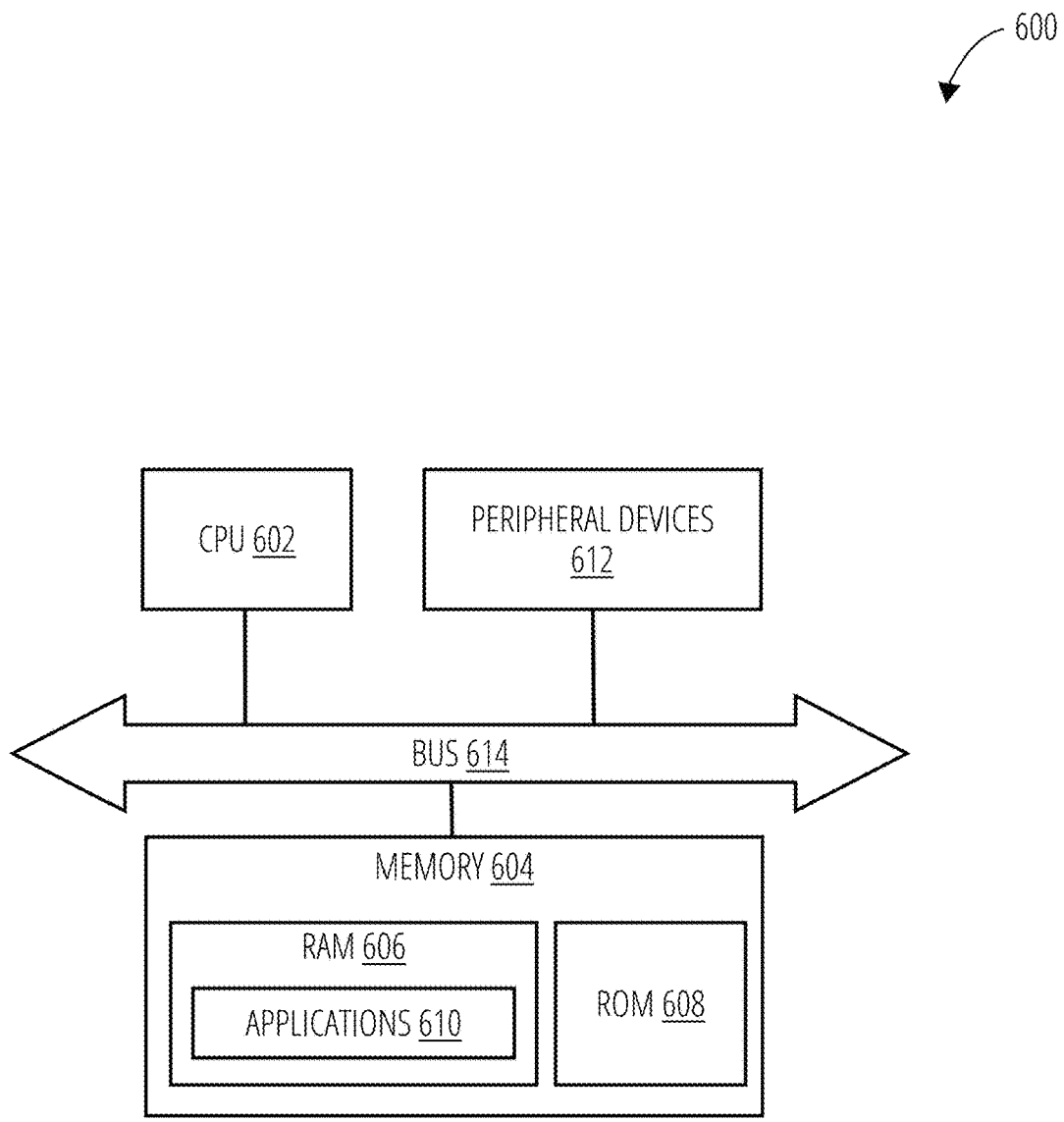
FIG. 6 is a block diagram of a device according to some embodiments.

FIG. 6 is a block diagram of a device according to some embodiments.

As illustrated, the device 600 can include a processor or central processing unit (CPU) such as CPU 602 in communication with a memory 604 via a bus 614. The device can also include one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 can comprise a general-purpose CPU. The CPU 602 can comprise a single-core or multiple-core CPU. The CPU 602 can comprise a system-on-a-chip (SoC) or a similar embedded system. In some embodiments, a graphics processing unit (GPU) can be used in place of, or in combination with, a CPU 602. Memory 604 can comprise a non-transitory memory system including a dynamic random-access memory (DRAM), static random-access memory (SRAM), Flash (e.g., NAND Flash), or combinations thereof. In one embodiment, the bus 614 can comprise a Peripheral Component Interconnect Express (PCIe) bus. In some embodiments, bus 614 can comprise multiple busses instead of a single bus.

Memory 604 illustrates an example of non-transitory computer storage media for the storage of information such as computer-readable instructions, data structures, program modules, or other data. Memory 604 can store a basic input/output system (BIOS) in read-only memory (ROM), such as ROM 608, for controlling the low-level operation of the device. The memory can also store an operating system in random-access memory (RAM) for controlling the operation of the device Applications 610 can include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device 600 can optionally communicate with a base station (not shown) or directly with another computing device. One or more network interfaces in peripheral devices 612 are sometimes referred to as a transceiver, transceiving device, or network interface card (NIC).

An audio interface in Peripheral devices 612 produces and receives audio signals such as the sound of a human voice. For example, an audio interface may be coupled to a speaker and microphone (not shown) to enable telecommunication with others or generate an audio acknowledgment for some action. Displays in Peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 can comprise any input device arranged to receive input from a user. An illuminator in peripheral devices 612 can provide a status indication or provide light. The device can also comprise an input/output interface in peripheral devices 612 for communication with external devices, using communication technologies, such as USB, infrared, Bluetooth™, or the like. A haptic interface in peripheral devices 612 can provide tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device can include more or fewer components than those shown in FIG. 6, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur in any order other than those noted in the illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    obtaining, by a device, a set of messages, each message comprising message metadata and a message structure, each message comprising a digital asset positioned within the message structure;
    clustering, by the device, the messages based on the message metadata;
    determining, by the device, a digital asset structure for the cluster, the digital asset structure comprising information related to the message structure of each message in the cluster;
    generating, by the device, a mapping rule for the cluster, the mapping rule comprising information related to the digital asset structure; and
    providing, by the device, at least one digital asset to third party system based on the mapping rule.

2. The method of claim 1, further comprising:
receiving a request from a user in association with a service provided by the third party system, wherein the at least one digital asset is provided in accordance with the received request.

3. The method of claim 1, further comprising:
classifying the cluster into a category based on a set of attributes of the messages in the cluster, wherein the cluster includes information associated with the category.

4. The method of claim 3, wherein the category corresponds to at least one of a keyword, digital asset and type of digital asset.

5. The method of claim 1, wherein a remainder of the set of messages are subject to clustering, wherein a mapping rule is further generated for each cluster.

6. The method of claim 1, wherein the mapping rule further comprises information associating the message metadata of each message in the cluster.

7. The method of claim 1, wherein the clustering of the set of messages is further based on the message structure.

8. The method of claim 1, wherein the digital asset structure comprises information related to the Hypertext Transport Protocol (HTTP) structure of the messages in the cluster.

9. The method of claim 1, wherein the set of messages correspond to a set of users.

10. The method of claim 1, wherein the set of messages correspond to messages in an inbox of a user.

11. A device, comprising:
a processor configured to:
obtain a set of messages, each message comprising message metadata and a message structure, each message comprising a digital asset positioned within the message structure;
cluster the messages based on the message metadata;
determine a digital asset structure for the cluster, the digital asset structure comprising information related to the message structure of each message in the cluster;
generate a mapping rule for the cluster, the mapping rule comprising information related to the digital asset structure;
receive a request from a user in association with a service provided by a third party system; and
provide at least one digital asset to the third party system based on the mapping rule.

12. The device of claim 11, wherein the processor is further configured to:
classify the cluster into a category based on a set of attributes of the messages in the cluster, wherein the cluster includes information associated with the category, wherein the category corresponds to at least one of a keyword, digital asset and type of digital asset.

13. The device of claim 11, wherein a remainder of the set of messages are subject to clustering, wherein a mapping rule is further generated for each cluster.

14. The device of claim 11, wherein the mapping rule further comprises information associating the message metadata of each of the messages in the cluster.

15. The device of claim 11, wherein the clustering of the set of messages is further based on the message structure.

16. A non-transitory computer-readable storage medium tangibly encoded with computer-executable instructions that when executed by a processor perform a method comprising:
obtaining, by a device, a set of messages, each message comprising message metadata and a message structure, each message comprising a digital asset positioned within the message structure;
clustering, by the device, a the messages based on the message metadata;
determining, by the device, a digital asset structure for the cluster, the digital asset structure comprising information related to the message structure of each of the messages in the cluster;
generating, by the device, a mapping rule for the cluster, the mapping rule comprising information related to the digital asset structure;
receiving, by the device, a request from a user in association with a service provided by a third party system; and
providing, by the device, at least one digital asset to the third party system based on the mapping rule.

17. The non-transitory computer-readable storage medium of claim 16, further comprising:
classifying the cluster into a category based on a set of attributes of the messages in the cluster, wherein the cluster includes information associated with the category, wherein the category corresponds to at least one of a keyword, digital asset and type of digital asset.

18. The non-transitory computer-readable storage medium of claim 16, wherein a remainder of the set of messages are subject to clustering, wherein a mapping rule is further generated for each cluster.

19. The non-transitory computer-readable storage medium of claim 16, wherein the mapping rule further comprises information associating the message metadata of each of the messages in the cluster.

20. The non-transitory computer-readable storage medium of claim 16, wherein the clustering of the set of messages is further based on the message structure.

* * * * *